United States Patent

[11] 3,605,111

[72] Inventor Ronald H. Schmoll
 Broadview Heights, Ohio
[21] Appl. No. 21,041
[22] Filed Mar. 19, 1970
[45] Patented Sept. 14, 1971
[73] Assignee Clevite Corporation

[54] TRACE-INTERRUPTING MULTICHANNEL RECORDER
 6 Claims, 7 Drawing Figs.
[52] U.S. Cl. .................................. 346/62, 346/136
[51] Int. Cl. ...................................... G01d 9/34
[50] Field of Search ........................... 346/62, 34, 136

[56] References Cited
 UNITED STATES PATENTS
 2,171,327  8/1939  Anderson .................. 346/62
 3,042,922  7/1962  Ledbetter .................. 346/62 X
 3,081,458  3/1963  Lee ........................... 346/45

Primary Examiner—Joseph W. Hartary
Attorney—Eber J. Hyde

ABSTRACT: A multichannel strip chart recorder has a commutator to sequentially sample signals at a plurality of channels and apply the samples to a single-pen recording device. A spring-biased actuator holds the pen off the chart during commutation. A solenoid overcomes the spring allowing the pen to record a dot for each signal sample. Thus, each signal is recorded as a trace made up of a series of dots. Trace-identifying symbols are preprinted sequentially and repetitively along an edge of the chart in predetermined relation to the chart sprocket holes. As each symbol moves into approximate alignment with the path of the recording pen tip the solenoid action is inhibited by signals from electro-optical devices sensing the positions of sprocket holes and notches at the edge of the chart so that the trace identified with that symbol is interrupted. When the signal at one channel has higher frequency content than the signals at other channels, the commutator sequence may be arranged to sample that signal more often than the signals at other channels.

PATENTED SEP 14 1971

INVENTOR.
RONALD H. SCHMOLL

BY

*Eber J. Hyde*

ATTORNEY

INVENTOR.
RONALD H. SCHMOLL

BY

ATTORNEY

TRACE-INTERRUPTING MULTICHANNEL RECORDER

BACKGROUND OF THE INVENTION

1. Field of the Invention

This invention relates to multichannel chart recorders of the type employing a single recording device and a commutator for sequentially recording samples of the signals at each channel.

2. Description of the Prior Art

Several types of multichannel recorders are well known. One type employs a plurality of mirror galvanometers. Each galvanometer reflects a spot of light to a light-sensitive chart, all spots following along the same path which is perpendicular to the direction of chart motion. Each galvanometer is connected to a different signal channel and deflects the light spot to a position across the chart corresponding to the magnitude of the signal at that channel. Such light-beam-deflecting systems may operate at high frequencies due to low inertia. Each channel may utilize the full chart width and this introduces channel identification problems due to crisscrossing of traces. One means for identifying channels is shown in U.S. Pat. No. 3,081,458. A motor-driven mechanism sequentially interrupts the light spots from the different galvanometers. A print wheel synchronized with the light-interrupting mechanism prints channel identifying numbers along one edge of the chart in alignment with the path of the light spots making the recordings. The complexity of the mechanism is a disadvantage.

High-speed multichannel recording also is accomplished by employing a plurality of recording mechanisms, usually D'arsonval coil-driven pens, in side-by-side alignment across the width of the chart. One recording mechanism and a portion of the chart are assigned to each signal channel as illustrated, for example, in U.S. Pat. No. 3,312,977. In this case, a sampling commutator is not required. Each trace may be a continuous line made by a lightweight pen which may be deflected rapidly. Trace identification is simplified because there is no crossing of one trace by another. Disadvantages of the system are the restricted channel width, and the number of recording mechanisms and drive amplifiers which are required.

Another type of multichannel recorder, used extensively in industry for recording temperature and the like, has a carriage riding on a track in a direction parallel to the chart surface and perpendicular to the direction of chart motion. A print mechanism is mounted on the carriage. A servo drive system positions the carriage along the track, i.e., across the width of the chart, according to the magnitude of the signal applied to the input circuit. A commutator sequentially connects the input circuit to the various channels carrying the signals to be recorded. For each channel sample, after the carriage comes to rest at the position indicating the magnitude of the signal then existing at the selected channel, the print mechanism is actuated momentarily to print a dot on the chart. Simultaneously a channel-identifying number is printed along side the dot. Such recorders are highly satisfactory for multichannel recording of signals which do not have high-frequency components, i.e., where the magnitudes of the signals do not change rapidly. The inertia of the carriage and the print mechanism make high-speed operation prohibitive.

An object of this invention is to provide a multichannel chart recorder, of the type having a single recording means and a commutator, which is capable of relatively high-speed operation.

Another object is to provide such a recorder with a simple mechanism for trace identification.

Another object is to provide such a recorder having higher resolution in one or more channels than in other channels.

SUMMARY OF THE INVENTION

This invention provides a recorder adapted to mark traces on a moving chart representing signals of varying magnitudes at each of a plurality of input circuits.

The recording means has a lightweight chart-marking element, and means for moving the marking element along a recording line transverse to the direction of chart motion, to positions representing the varying magnitude of an applied signal.

A commutator connects each input circuit to the recording means in predetermined sequence.

Trace-control means are provided for selectively permitting and preventing marking on the chart without interfering with movement of the marking element along the recording line.

The trace-control means are actuated to prevent marking during switching by the commutator and to permit marking only during the time that the marking element is at the position representing the signal at the then connected input circuit.

The chart is preprinted sequentially and repetitively with a plurality of trace-identifying symbols along an edge of the chart. There is a different symbol for, and identified with, each input circuit.

Each time that one of the identifying symbols is in approximate alignment with the recording line, trace-interrupting means, controlled at least in part by the chart, influence the action of the trace-control means to prevent marking of the trace of the signal corresponding to that symbol. Thus, each trace may be identified by the marginal symbol in line with periodic breaks in the trace.

The sequence of connections of the input circuits by the commutator may be selected to connect one input circuit more often than other input circuits, thereby providing better recording resolution for rapidly changing data at that input.

BRIEF DESCRIPTION OF THE DRAWINGS

FIG. 3 illustrates how the trace-identifying symbol sensor may be constructed.

DESCRIPTION OF THE PREFERRED EMBODIMENTS

Figure 1:
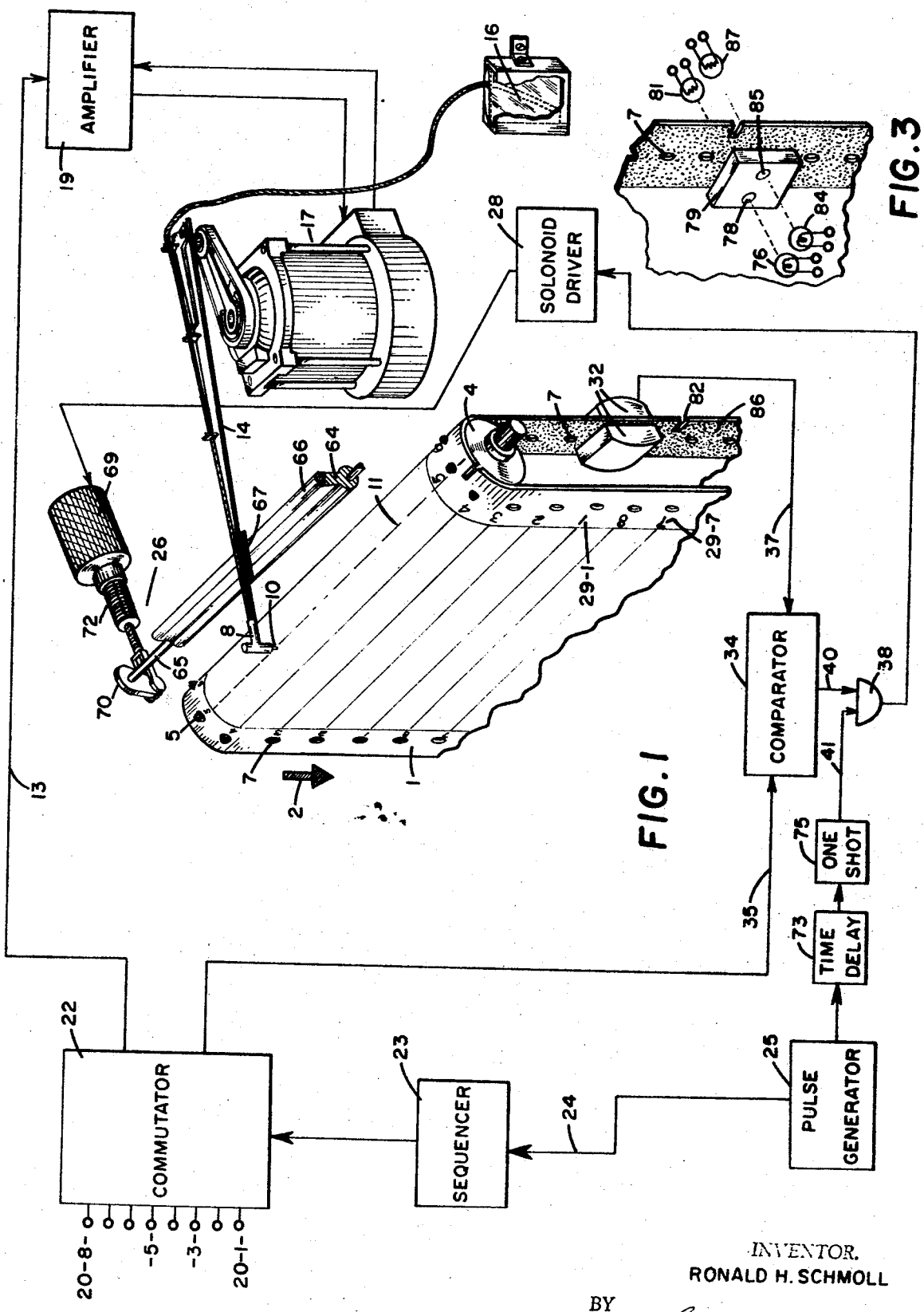
FIG. 1 is a schematic representation of a multichannel recorder according to this invention.

A multichannel strip chart recorder embodying the present invention is shown in schematic form in FIG. 1.

Chart 1 is driven at uniform velocity in the direction of arrow 2 by roller 4 having sprockets 5 engaging sprocket holes 7. Conventional means, not shown, drive roller 4 at suitable, constant velocity.

Means are provided for moving a chart-marking element 8 to positions along recording line 11 representing a signal of varying intensity applied to line 13. The marking element 8 has an inking tip or nib 10 supplied with ink from reservoir 16. The means for positioning marking element 8 include pen arm 14, pen motor 17, and pen-drive amplifier 19.

A plurality of signals to be recorded may be applied in input terminals 20–1 to 20–8. Commutator 22 connects input terminals 20 to line 13 in predetermined sequence, thus pen tip 10 is sequentially deflected to positions along recording line 11 corresponding to the varying magnitudes of the signals at terminals 20. Commutator 22 is actuated by pulses from sequencer 23 which is driven by pulse generator 25.

Trace-control means are provided for marking on chart 1 by pen tip 10 at desired times and for preventing such marking at other times. These means include actuator 26 and driver 28. Actuator 26 normally holds pen 10 away from the chart. However, when a pulse controlled by pulse generator 25 is applied to driver 28, the pen is momentarily lowered to contact the chart.

Circuit means including pulse generator 25, gate 38, and driver 28 are provided for pulsing actuator 26 after each transition from one input circuit 20 to the next input circuit at commutator 22. Thus, a plurality of traces, each corresponding to a signal at a different input circuit 20, may be made on chart 1, each as a series of dots. During each time the pen tip 10 is being displaced to a new position along recording line 11 representing a signal at a different input circuit, the actuator 26 holds the pen tip 10 off the chart to prevent marking during such transition.

Each trace may, depending on the signal, extend from one edge of the chart to the other and, accordingly, there is the possibility of frequent crisscrossing of traces. To simplify the identification of traces with input circuits, trace-identifying symbols 29 are preprinted on the chart sequentially and repetitively. The symbols may be words such as "temperature," "pressure," etc., or letters or numerals, or other identification. Each symbol is identified with an input circuit 20. Additionally, trace-interrupting means are provided for inhibiting operation of pen-down actuator 26, to interrupt each trace as the symbol corresponding to the input circuit producing that trace comes into approximate alignment with recording line 11, as shown in FIG. 2.

Figure 2:
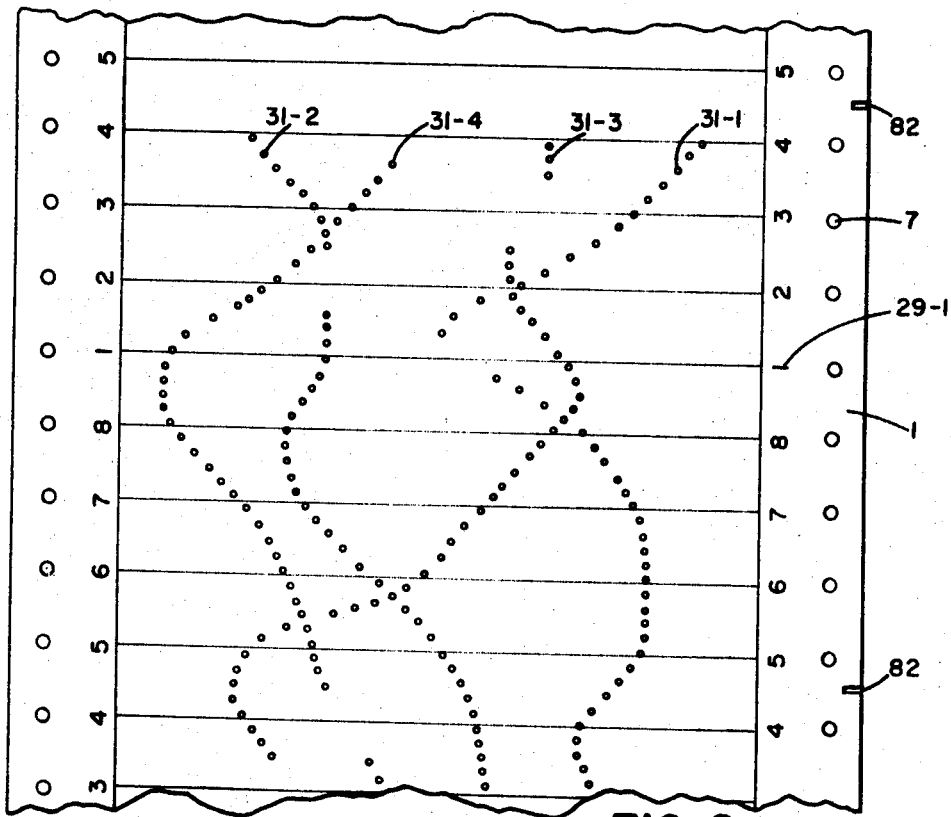
FIG. 2 shows a portion of a chart record made by the recorder of FIG. 1.

FIG. 2 shows a section of chart 1 with four traces, 31–1, 31–2, 31–3, 31–4. Trace 31–1 represents a signal that was applied to input 20–1. Note that the trace is interrupted opposite preprinted identifying numeral 29–1. Similarly, 31–2 represents a signal that was applied to terminal 20–2 and is interrupted opposite identifying numeral 29–2, etc.

The trace-interrupting means comprise sensing means 32, and comparator 34 which, at appropriate times, inhibit the pulsing of actuator 26. Comparator 34 receives pulses over line 35 from separate contacts at commutator 22 indicating which input circuit is connected by the commutator to line 13. Comparator 34 also receives signals from sensing means 32 over line 37 indicating which identifying symbol, if any, is in approximate alignment with the path 11 of pen tip 10. Whenever a trace-identifying numeral 29–3, for example, is in approximate alignment with recording line 11 and commutator 22 has connected the corresponding input circuit, 20–3 in this example, comparator 34 senses this coincidence, driving the input 40 of AND gate 38 to "0," thus inhibiting the action of actuator 26. This holds the pen up off the chart when it would otherwise mark dots during sampling of channel 3.

It often happens that signals carried by one or two channels change in magnitude much more rapidly than the data in other channels. If a conventional commutator arrangement is used sampling the channels in 1, 2, 3, 4, 5, 6, 7, 8, 1, 2, 3 sequence then the frequency range of signals which may be recorded without excessive loss of resolution may be severely limited by the relatively wide spacing of the sample dots. I have found that signals with higher rates of change of intensity may be recorded satisfactorily by arranging the commutator sequence to sample the "fast" channels more often than the other channels. For example, if channels 1 and 2 carry signals changing much more rapidly than the signals in other channels it is advantageous to use the following sampling sequence: 1, 2, 3; 1, 2, 4; 1, 2, 5; 1, 2, 6; 1, 2, 7; 1, 2, 8; 1, 2, 3, etc. This places the sample dots much closer together for channels 1 and 2 at the expense of wider spacing for the remaining channels.

The sampling sequence is controlled by sequencer 23 which may be arranged to provide a variety of sequences selected by a switch or switches not shown. The switching may be arranged also to bypass unused channels so that all sample pulses are utilized in sampling only the channels being recorded.

Certain elements of FIG. 1 will now be described in greater detail.

Pen Positioning System:

It will be appreciated that in order to avoid excessive time between sample dots at each trace, pen motor 17 and amplifier 19 must be capable of moving pen tip 10 rapidly and accurately between any two positions along recording line 11. For this purpose I prefer to employ an electrodynamic drive system with a rectilinear pen mechanism and position feedback generally as described by A. D. Brown, Jr., and C. L. Morris in U.S. Pat. No. 3,088,788, May 7, 1963. An eight-channel recorder, according to this invention, and employing the principle of U.S. Pat. No. 3,088,788, now marketed by the assignee of this application, has a sample rate of 20 samples per second with a useful chart width of 4½ inches.

Chart-Marking Element:

The tip 10 of marking element 8 is held off the chart by actuator 26 during motion along recording line 11.

When a conventional recording pen is used there is a tendency for ink to drip and to spatter during the rapid motion. Accordingly, I prefer to employ a porous member for tip 10, such as a bundle of dacron fibers or the like. The porosity permits ink to flow by capillary action when in contact with the chart but tends to prevent dripping and spattering. Additional restriction of ink flow may be provided by inserting a porous member within marking element 8 through which the ink must flow.

Figure 4:
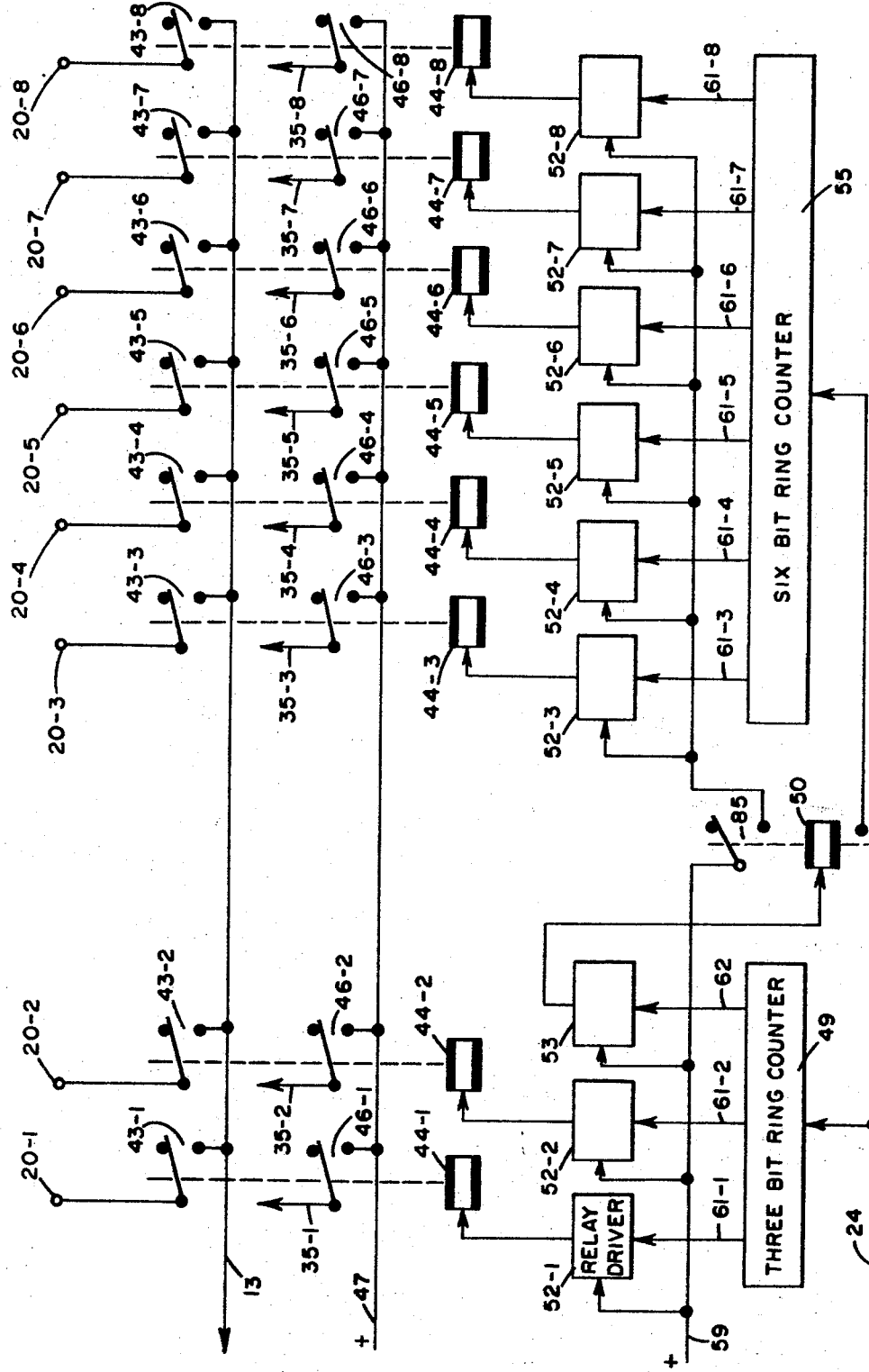
FIG. 4 is a more detailed schematic diagram of a portion of the recorder of FIG. 1.

Commutator:

Commutator 22 is shown in greater detail in FIG. 4. It may conveniently comprise a plurality of electromagnetic relays of the reed type, one for each input terminal 20. In FIG. 4, any selected input circuit 20–1 to 20–8 may be connected to line 13 through reed contacts 43–1 to 43–8, respectively, by energizing corresponding coil 44–1 to 44–8. The relay coils 44 may be energized in selected sequences by sequencer 23.

For simplicity, only one input terminal 20 and one set of input reed contacts 43 are shown for each channel. It should be understood, however, that the other side of each input circuit may be connected to the input of amplifier 19 via ground, or through additional reed contacts at each relay.

Additional contacts 46–1 to 46–8 are actuated by energizing coils 44–1 to 44–8, respectively. When one of these contacts closes it connects DC line 47 to comparator 34 over a line 35. Thus, when input terminal 20–3, for example, is connected momentarily to line 13, through contacts 43–3, to actuate pen motor 17 (FIG. 1), comparator 34 is connected to DC line 47 through contacts 46–3 and line 35–3.

Sequencer:

FIG. 4 also shows the sequencer 23. It is arranged to drive commutator 22 to sample channels 1 and 2 more often than the remaining channels. This is done so that signals with higher frequency components may be recorded from channels 1 and 2 without excessive dot spacing. Three-bit ring counter 49 energizes commutator relay coils 44–1, 44–2, and relay coil 50 sequentially through relay drivers 52–1, 52–2, and 53. The counter is actuated each time a pulse from generator 25, at line 24, drops from "1" to "0."

Six-bit ring counter 55 energizes commutator relay coils 44–3, to 44–8 sequentially through relay drivers 52–3 to 52–8, respectively. This counter is actuated in similar manner by pulses from pulse generator 25 over line 24, but only when contacts 56 are closed by coil 50. Furthermore, relay coils 43–3 to 43–8 can be energized only when power is supplied to relay drivers 52–3 to 52–8 through contacts 58 from DC line 59.

The operation of the sequencer may be traced as follows: Assume that at the start of this analysis, output 61–1 of counter 49 and output 16–4 of counter 55 are at level "1," due to prior events, and all other outputs 61 are "0." Coil 44–1 will thus be energized by driver 52–1 holding contacts 43–1 closed, connecting signal input 20–1 to line 13. Coil 44–4 will not be energized because contacts 58 are open, preventing application of power to driver 52–4.

As the first pulse occurs at line 24, and then falls from "1" to "0," it actuates counter 49 to return line 66–1 to "0," disconnecting input 20–1, and to raise line 61–2 to "1," connecting input 20–2. Nothing happens at counter 55 because contacts 56 are open.

As the second pulse at line 24 falls from "1" to "0," line 61–2 returns to "0," disconnecting input 20–2. At the same time, line 62 goes to "1," energizing coil 50 which closes contact 58, thus applying power to driver 52–4. Since line 61–4 has remained at "1," input 20-4 now is connected by the action of coil 44-4 on contact 43-4. Contacts 56 also are closed, but with no immediate consequence.

As the third pulse falls from "1" to "0," both counters are shifted. At counter 49 line 62 returns to "0," opening contact 58. This deenergizes driver 52-4, disconnecting input 20-4. Also at counter 49, line 61-1 goes to "1," connecting input 20-1. At counter 55, before contacts 56 open, the collapsing third pulse returns line 61-4 to "0" and raises line 61-5 to "1." Coil 44-5, however, is not energized because contacts 58 by this time are open.

As the fourth pulse at line 24 falls to "0," input 20-1 is disconnected and input 20-2 is connected. Nothing happens at counter 55 because contacts 56 are open.

As the fifth pulse falls to "0," input 20-2 is disconnected and coil 62 is energized. This applies power through contacts 58 to drivers 52-3 to 52-8 and connects input 20-5 since line 61-5 was set at "1" by the third pulse.

As the sixth pulse falls to "0," line 62 returns to "0," opening contacts 58 to disconnect input 20-5. At the same time, line 61-1 again goes to "1," connecting input 20-1. The collapse of the sixth pulse also actuates counter 55 before contacts 56 open. This returns line 61-5 to "0" and raises line 61-6 to "1." Relay coil 44-6 is not energized, however, because contacts 58 by this time are open.

Extending the above analysis until all inputs 20 have been connected at least once, it can readily be seen that the sampling sequence is 1, 2, 4; 1, 2, 5; 1, 2, 6; 1, 2, 7; 1, 2, 8; 1, 2, 3. Thus, each input 20-1 and 20-2 is connected six times for one connection of each of the other inputs.

Figure 6:
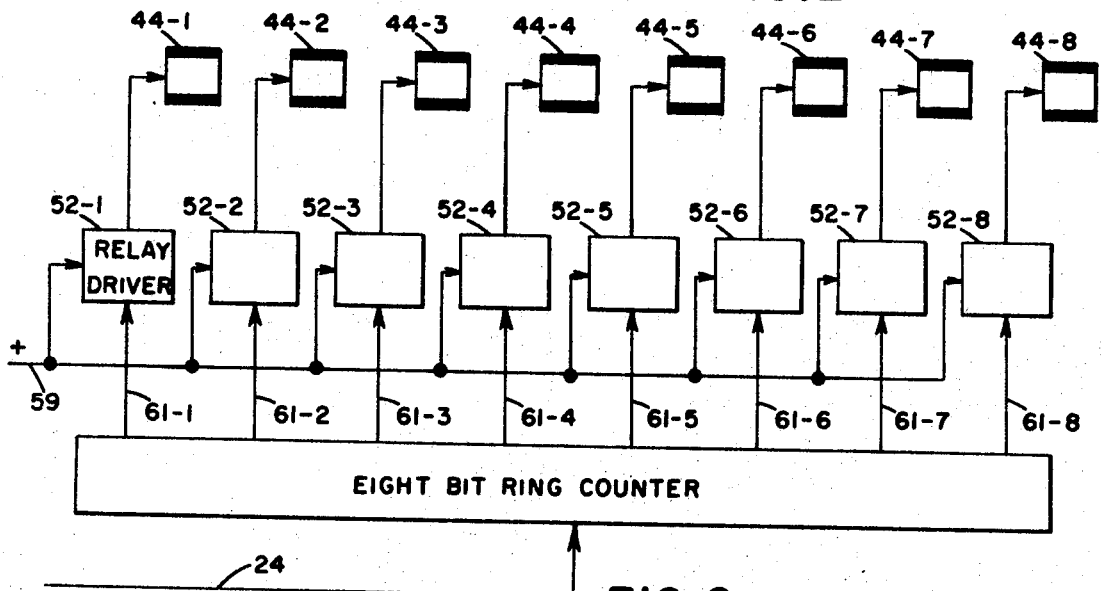
FIG. 6 illustrates a modification of a portion of FIG. 4.
Figure 5:
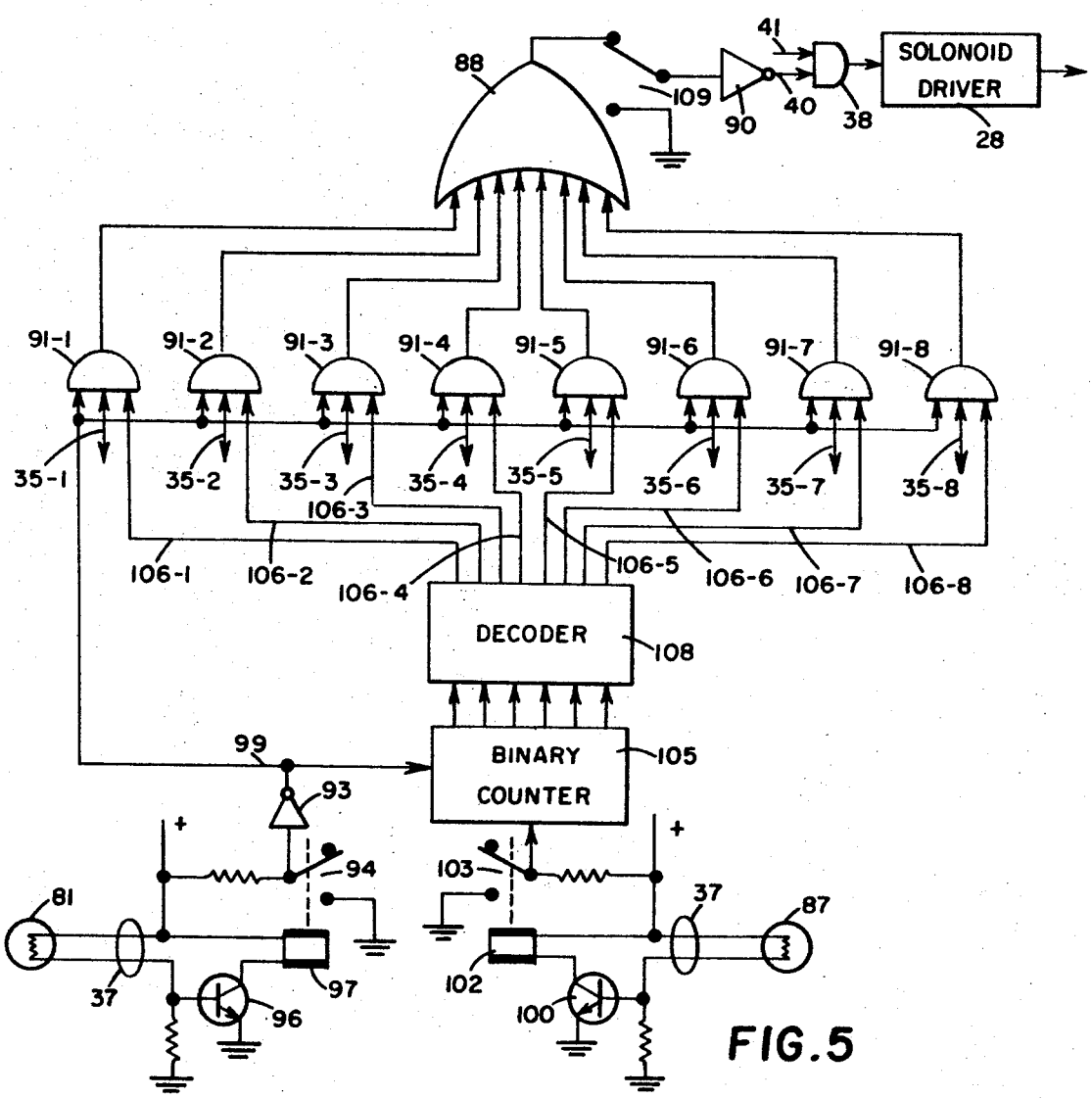
FIG. 5 is a schematic representation of another portion of the recorder of FIG. 1.
Figure 7:
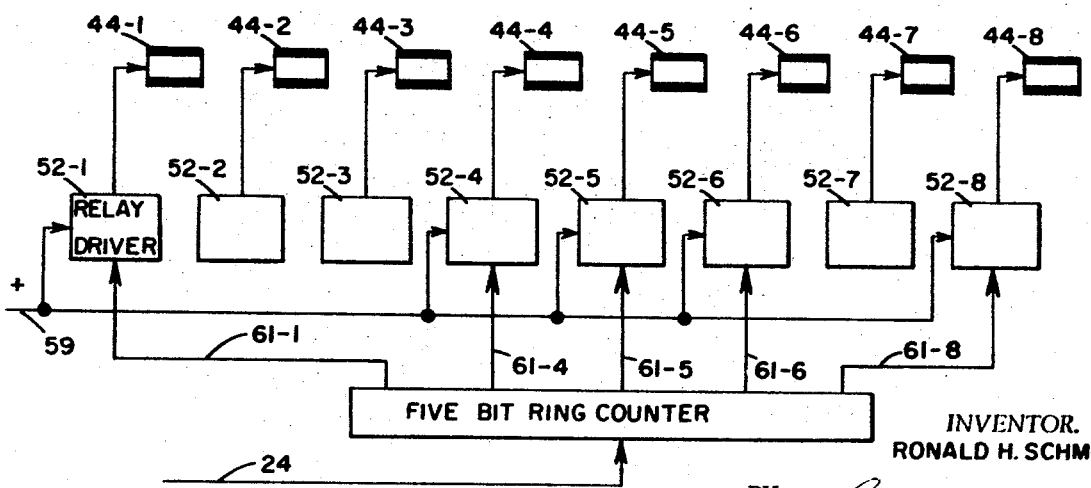
FIG. 7 illustrates another modification of a portion of FIG. 4.

When it is desired to sample all channels equally, ring counters 49 and 55 may be replaced by an eight-bit ring counter as shown in FIG. 6. When fewer than eight channels equally, are to be used, it is advantageous to disable the inactive channels and employ every pulse in switching only the active channels. For example, in FIG. 7, channels 2, 3, and 7 are not used. To avoid wasting sample time on inactive channels, the eight-bit ring counter of FIG. 5 is reduced to a five-bit ring counter.

The three-bit ring counter 49 and the six-bit ring counter 55 of FIG. 4 may be formed using three and six flip-flops, respectively in well-known manner. By suitable switching of interconnections, the flip-flop may be rearranged to form the eight-bit counter of FIG. 6 or the five-bit counter of FIG. 7, or any other desired configuration.

Pen-Down Actuator:

Actuator 26 comprises a cam bar 64 mounted for limited angular motion about shaft 65. It may be made of any suitable plastic, for low inertia, and have an insert 66 of molybdenum-disulfide-filled nylon along the line of contact with pen 14 for long wear properties. A piece of glass 67 is cemented to the under side of pen 14 where the latter is engaged by insert 66 to reduce friction and wear. Solenoid 69 is coupled to the cam bar 64 by crank arm 70. Spring 72 holds the cam bar in engagement with glass plate 67 of pen 14 raising pen tip 10 slightly away from chart 1. When the solenoid is energized it rotates cam bar 64, lowering pen 14 so that tip 10 engages the chart.

Pen-Down Circuit:

Pulses from generator 25 are delayed at 73 and then delivered to a one shot network 75 to generate suitable "Pen-Down" pulses which go to input 41 of AND gate 38. Terminal 40 of gate 38 normally is held at "1" by comparator 34 and, accordingly, the pen-down pulses from 75 normally are passed to solenoid driver 28. Thus, for each pulse, solenoid 69 is actuated momentarily to permit pen tip 10 to contact chart 1 to mark a dot thereon. The delay at 73 is adjusted so that the pen is off the chart during commutation, and the "on" time of "One Shot" 75 is adjusted to control the pen-down time.

Symbol Sensor:

The function of sensor 32 is to supply information to comparator 34 indicating when an identifying symbol on the chart is in approximate alignment with recording line 11, and indicating the identity of the symbol. At the comparator, this information is compared with information from the commutator indicating which channel is being sampled, and at appropriate times an inhibit signal ("0") is delivered to AND gate 38 to prevent actuations of the pen-down solenoid.

FIG. 3 illustrates a simple sensor of chart symbol position and identity. Cutout areas along the edge of the chart, in the form of sprocket holes, and notches, are located in predetermined relation to the trace-identifying symbols, and are sensed by light-sensitive devices.

Light from lamp 76 passes through aperture 78 in block 79 and falls on chart 1 in line with the path of sprocket holes 7. Block 79 may be a part of a lamp holder and enclosure not shown. Photocell 81 is located on the opposite side of chart 1 in alignment with aperture 78 so that it is illuminated by lamp 76 whenever a sprocket hole 7 moves into approximate alignment with aperture 78. Identifying symbols 29 are preprinted on the chart in predetermined relation to the sprocket holes. In FIG. 2 they are shown as numerals in alignment with the sprocket holes. Thus, by suitable placement of aperture 78, along the path of sprocket holes 7, photocell 81 will be illuminated every time an identifying numeral 29 is in alignment with recording line 11 (FIG. 1). Photocell 81, thus, is adapted to produce a pulse for each arrival of a symbol at line 11.

To identify the symbols, the chart 1 is provided with notches 82 cut in one edge at regular intervals in predetermined relation to the identifying symbols 29-1 to 29-8. In FIG. 2 the notches are located midway between symbols 29-4 and 29-5. Light from lamp 84 passes through aperture 85 which is in alignment with the path of notches 82. Photocell 87, on the other side of chart 1, is illuminated whenever a notch 82 comes into alignment with aperture 85. Thus, photocell 87 is adapted to produce one pulse after each passage of eight identifying symbols past recording line 11 and in predetermined relation to the passage of specific symbols. A black stripe 86 is printed along the edge of the chart to reduce reflections which otherwise might interfere with operation of the sensor.

Photocells 81 and 87 are connected to comparator 41 by lines 37.

Comparator:

FIG. 5 shows how the trace-identification circuits function. The inputs and the output of OR gate 88 normally are "0," holding the output of inverter 90 at "1." Therefore, input 40 to AND gate 38 normally is "1," permitting "pen-down" pulses at input 41 to actuate solenoid 69 of pen actuator 26.

Commutator 22 supplies a "1" over one of the lines 35-1 to 35-8 every time it connects a corresponding signal input circuit 20-1 to 20-8 to the pen motor 17 by way of line 13. This pulse goes to one of three inputs of corresponding AND gate 91-1 to 91-8.

The output of inverter 93 normally is held at "0" by the positive input, relay contacts 94 being open.

Every time an identifying numeral 29 comes into approximate alignment with recording line 11, photocell 81 in sensor 32 is illuminated through aperture 78 and a sprocket hole 7. This turns on transistor 96, energizing relay coil 97. Thus, contacts 94 close, shifting the output 99 of inverter 93 to "1." Thus, one input of each AND gate 91 goes to "1."

Notch-sensing photocell 87 in sensor 32 momentarily turns on transistor 100 once for each passage of eight identifying numerals 29 past recording line 11. The pulses applied to transistor 100 energize coil 102 to close contacts 103 and each time this occurs, counter 105 is reset.

Sensor 32 may be positioned along the direction of chart travel so that the counter is reset by the passage of notch 82 immediately after identifying numeral 29-8 on the chart passes recording line 11.

The pulses at line 99 also actuate counter-decoder 105, 108. The first pulse after the counter is reset occurs as identifying numeral 29-1 moves into alignment with recording line 11. At the occurrence of this first pulse, line 106-1 from the decoder 108 is raised to "1." The next pulse, occurring when numeral 29-2 is in alignment with recording line 11, returns line 106-1 to "0" and raises line 106-2 to "1," etc.

If sensor 32 is located at a different position along the direction of chart travel so that notch 82 passes photocell 87 immediately after some numeral other than 29–8 leaves recording line 11, it is only necessary to reconnect lines 106 to establish the correct sequence of pulses at AND gates 91. The requirement is that decoder 108 supply "1" to AND gate 91–1 when identifying numeral 29–1 is at recording line 11, supply a "1" to AND gate 91–2 when numeral 29–2 is at recording line 11, etc.

Now, consider the operation of a particular channel, such as channel 3. The input signal at terminal 20–3 periodically is connected to pen motor 17 by commutator 22 via line 13 and amplifier 19. Pen tip 10 deflects to a position along recording line 11 corresponding to the magnitude of the signal then existing at input 20–3. While the pen tip is in this position it is momentarily lowered into contact with chart 1 by actuator 26, thus making a dot on the chart adding to trace 31–3.

During the time that input 20–3 is connected by the commutator, contacts 46–3 in the commutator energize line 35–3 to an input of AND gate 91–3. Most of the time this has no effect because the other two inputs to the gate are "0."

However, when identifying numeral 29–3 comes into alignment with recording line 11, decoder 108 applies "1" to an input to gate 91–3 over line 106–3 and, at the same time, the third input to gate 91–3 receives a "1" over line 99. Thus, each time line 35–3 is pulsed by commutator 22 corresponding to sampling of the signal at input 20–3, all three inputs to AND gate 91–3 are at "1." This raises the output of OR gate 88 to "1" during each pulse at line 35–3 and drops input 40 of AND gate 38 to "0." When this occurs, the "pen-down" pulses for channel 3 applied to input 41 of AND gate 38 have no effect. Thus, pen actuator 26 does not allow the pen tip 10 to contact the chart "1." This inhibiting effect occurs only during sampling of channel 3 because only AND gate 91–3 has all three inputs simultaneously at "1."

As identifying numeral 29–3 moves away from recording line 11, sprocket-hole-sensing photocell 81 turns off transistor 96 and this returns line 99 to "0." Now AND gate 91–3 no longer is enabled, the output of OR gate 88 drops to "0," and input 40 of AND gate 38 returns to "1." This permits actuator 26 to resume operation during sampling of channel 3.

When numeral 29–4 moves into alignment with recording line 11, similar action takes place involving AND gate 91–4 and this causes interruption of trace 4, etc.

Switch 109 is provided to disable the trace-interruption circuits.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A chart recorder adapted to mark traces on a moving chart representing signals of varying magnitudes at each of a plurality of input circuits comprising:
    a. recording means having a chart-marking element, and means for moving said marking element along a recording line transverse to the direction of chart motion to positions representing the varying magnitude of a signal applied to said means;
    b. a commutator adapted to connect each input circuit to said recording means in predetermined sequence;
    c. trace control means adapted selectively to permit and to prevent marking on the chart by said marking element without interfering with movement of said marking element along said recording line;
    d. means for actuating said trace-control means to prevent marking during switching from one input circuit to another input circuit by said commutator, and to permit marking only during the time that the marking element is in the position representing the magnitude of the signal at the input circuit then connected by said commutator;
    e. a plurality of trace identifying symbols, a different one thereof identified with each of said input circuits, preprinted sequentially and repetitively along an edge of said chart; and
    f. trace-interrupting means, controlled, at least in part, by the chart during each time that one of said identifying symbols is in approximate alignment with said recording line, influencing the action of said trace control means to prevent marking of the trace of the signal from the input circuit identified with the symbol which is then in approximate alignment with said recording line.

2. A chart recorder as described in claim 1 in which the sequence of connections of said input circuits by said commutator is such that one input circuit is connected more often than other input circuits.

3. A chart recorder as described in claim 1 in which the chart has cutout areas along an edge thereof at predetermined locations relative to the identifying symbols, and the trace-interrupting means include means for sensing each of said cutout areas as it moves into approximate alignment with a predetermined position relative to said recording line.

4. A chart recorder as described in claim 3 in which the means for sensing cutout areas comprise a light source and a light-sensitive device.

5. A chart recorder as described in claim 1 in which the traces are ink traces applied by a pen positioned by said recording means, and the trace-control means comprise means for moving the pen into and out of contact with the chart.

6. A chart recorder as described in claim 5 in which the chart is a strip chart having sprocket holes along an edge, the trace-identifying symbols are preprinted with spacing equal to the spacing of the sprocket holes, and there are N input circuits; and in which the trace-interrupting means comprise: the said sprocket holes, a notch in the edge of the chart after every N sprocket hole, a light-operated sensor producing a pulse upon passage of each sprocket hole, a light-operated sensor producing a pulse upon passage of each notch, means associated with said commutator supplying control signals indicating which of said input circuits is connected by said commutator, and circuit means controlled by said pulses and said control signals for influencing said trace-control means to hold the pen out of contact with the chart to prevent marking as described in claim 1.